July 15, 1958  F. WARREN  2,843,416
PARACHUTE RELEASE APPARATUS
Filed June 20, 1956  2 Sheets-Sheet 1

INVENTOR.
FORREST WARREN
BY
ATTORNEYS

July 15, 1958  F. WARREN  2,843,416
PARACHUTE RELEASE APPARATUS
Filed June 20, 1956  2 Sheets-Sheet 2

INVENTOR.
FORREST WARREN
BY
ATTORNEYS

United States Patent Office 2,843,416
Patented July 15, 1958

2,843,416

PARACHUTE RELEASE APPARATUS

Forrest Warren, San Diego, Calif., assignor to the United States of America as represented by the Secretary of the Air Force Application June 20, 1956, Serial No. 592,700

2 Claims. (Cl. 294—83)

The subject invention relates to a parachute release apparatus in which a mechanical disconnect assembly is actuated by an electrically operated pyrotechnic charge, or other suitable release means, to disconnect a parachute from a suspended load when the load makes contact with the ground surface. More particularly, subject invention relates to a disconnect assembly installed between a parachute riser system of a target drone or missile and the main recovery parachute suspension lines which is operative by remote means attached to the target drone or missile to disengage the parachute therefrom on contact with the ground or water.

It is a primary object of the present invention to provide a disconnect assembly which can be positively actuated by release means associated with the target drone to disengage an attached parachute from the target drone upon impact with the ground to thereby prevent damage to the drone by being dragged along the ground by the parachute.

It is another object to provide a disconnect assembly which may be securely coupled against axial loading but which is freely and independently rotatable about its points of connection to prevent twisting and stress between the coupled members.

It is another object to provide a parachute release apparatus which requires a positive impact with the ground surface to release the parachute and is reliable in opening and consequently safe in handling and transporting.

It is another object to provide a disconnect assembly having a minimum number of parts, compact, and which may be actuated by any suitable remote control means to release a parachute.

It is a further object to provide a parachute release assembly which is easy to install and which may be released automatically by operation of the release means or manually without operation of the release means.

It is still a further object to provide a disconnect assembly which is coupled together at a plurality of points to insure a positive connection between the parachute and target drone, yet which may be uncoupled simultaneously at each point to thereby permit instantaneous release of the parachute.

To accomplish the foregoing objects and purposes of the present invention for the parachute release apparatus, the basic components are a parachute disconnect assembly interconnecting a parachute and load having a support member and coupling means for connection to the support member by means of a plurality of locking means forced into position with the support member by a cam member, and release means acting to force the locking means out of locking position in response to the impact with the ground.

The invention may be more fully understood from the following detailed description and operation in connection with the accompanying drawings, in which.

Figures 1, 2:
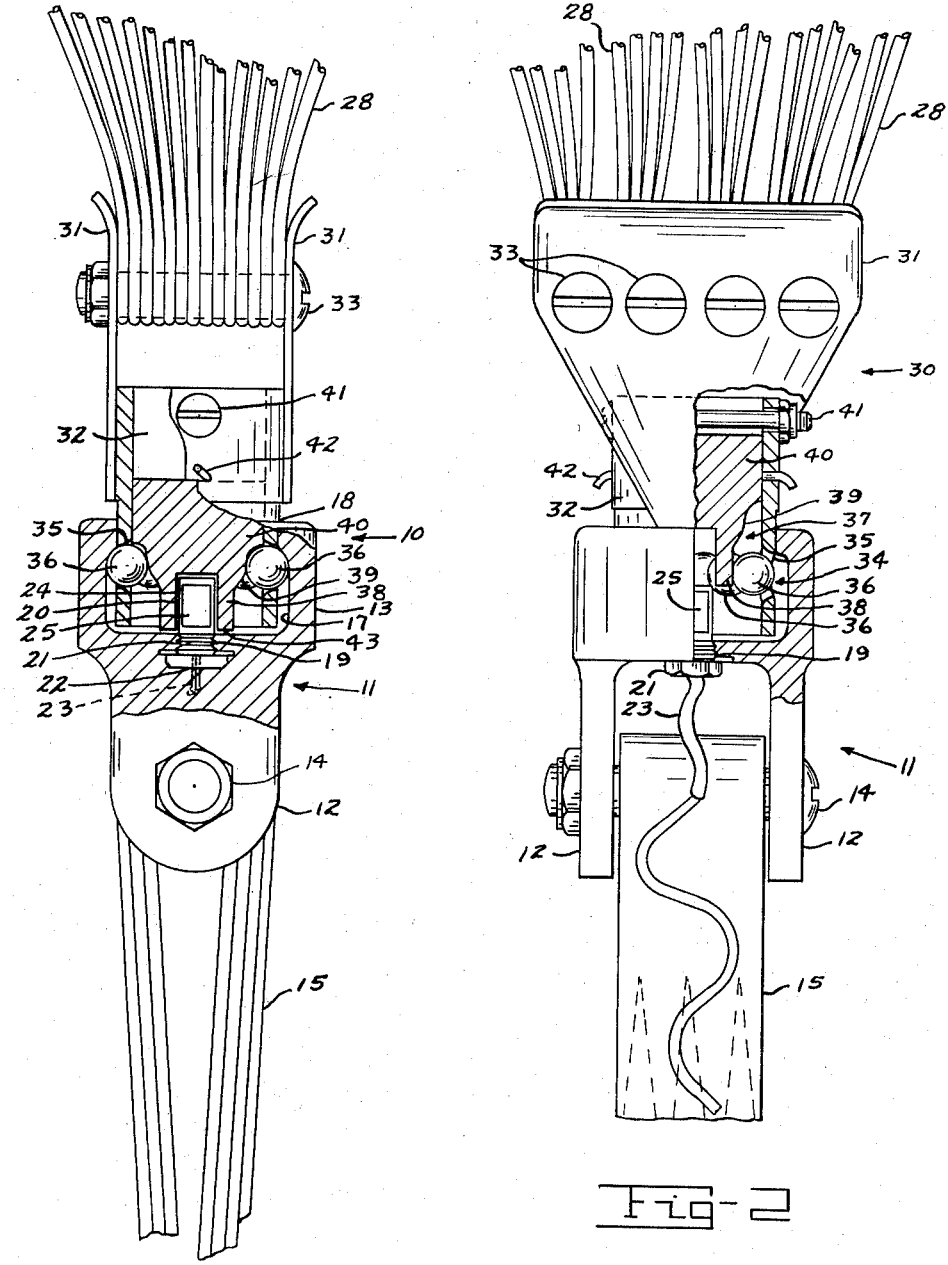
Figure 1 is a side view of the disconnect assembly partially in section to show the assembly of the coupling and support in connected relation.
Fig. 2 is a side view taken at right angles to Fig. 1 of the disconnect assembly after the release means have been energized to actuate the disconnect assembly for the ground release of the parachute.

Referring more particularly to Figs. 1 and 2, there is shown the parachute disconnect assembly 10 provided with a terminal support member or clevis 11 having bifurcated end portions 12 at its lower end verging upwardly into an upper cylindrical chamber portion or socket 13. Positioned across the bifurcated portions 12 and threaded therethrough is a bolt 14 to support riser 15 extending from a target drone or load 16. The upper chamber 13 includes a bowl-shaped aperture or recess 17 and a collar flange or annular lip portion 18 surrounding the recess entrance. A threaded bore 19 extends upwardly from a position intermediate the bifurcated ends 12 into the bottom of the recess 17 for placement of an explosive container 20. The explosive container 20 is made up of a screw or stud portion 21 for engagement with the bore 19, a bore 22 passed within the stud 21 for insertion of primer wires 23, and a cylindrical portion 24 positioned on the stud 21 for placement of an explosive charge 25 which is connected with the primer wires 23.

Suspended from a plurality of shroud attachments 28 is an upper coupling member or fitting assembly 30 having upper bifurcated end portions 31 and a cylindrical retaining cage or tubular member 32 welded within the bifurcated end portions 31. A series of four bolts 33 is attached across the ends 31 for placement and connection of the shrouds 28. The cage 32 houses a locking means or ball bearing ring 34 made up of a plurality of transverse openings or circular slots 35 spaced about the lower end thereof, the peripheral surface of each slot converging from the inside of the cage to the outside surface to form annular seats for the retention of an equal number of locking members or spherical balls 36. Each of the balls 36 are of slightly larger diameter than the outer peripheral surface of each slot and less than the inner surface diameter so that a portion of the balls, when seated within each of the slots will protrude beyond the outer cage surface, as shown in Fig. 1.

A cam member 37 is slidably carried within the tube 32 and includes a cylindrical shank 38 at its lower extremity which acts as an inner race to retain the balls 36 in position adjacent and partially within each slot 35, as illustrated in Fig. 2. A cam surface or shoulder 39 extends upwardly from the inner race 38 and can be pressed downwardly to force the balls 36 into each slot to protrude through the openings 35 into locking position within the chamber recess 17 and against the flange 18, as shown in Fig. 1. The cam surface 39, in turn, verges outwardly into a cylindrical barrel portion 40 slidably supported by the tube 32. To retain the slidable cam member 37 within the tube a bolt 41 is provided at the upper end of the tube to limit the upward movement of the cam member so that the inner race portion will remain in contact with the ball 36, and a wire or shear pin 42 is passed through the tube at an intermediate position below the bolt 41 to insure retention of the cam member 37 in locking position against the balls 36. The cam member 37 is further provided with a primer bore 43 passed upwardly within the inner race portion to house the primer container 20 when the cam member is in downward locking position within the chamber recess 17.

Figure 3:
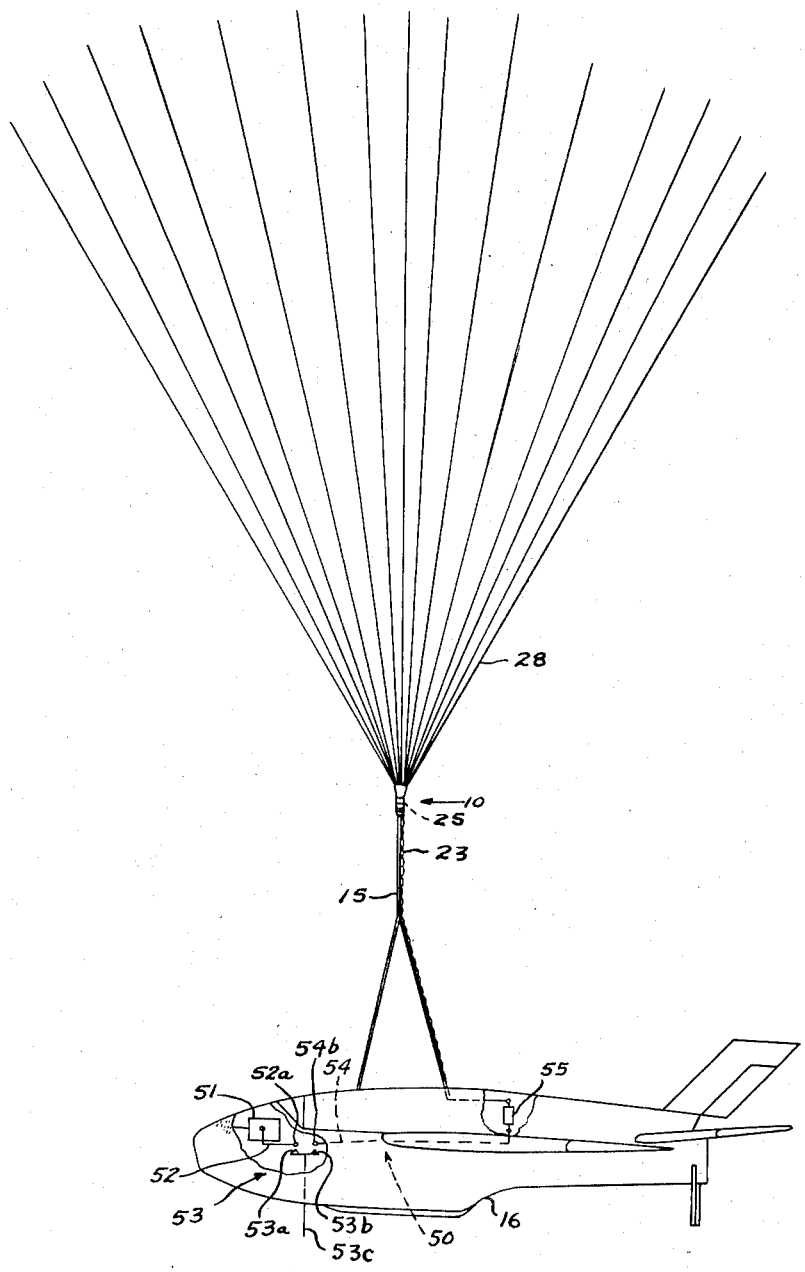
Fig. 3 is a somewhat schematic view of the electrical release system and disconnect assembly in assembled relation in descent.

A suitable ground release system for uncoupling the disconnect assembly includes the primer 25 and primer wires 23 attached to the riser 15 and leading into the primer, together with electric circuit 50 shown in Fig. 3. The electric circuit 50 is made up of voltage source 51 located in the nose of the target drone 16, lead wire 52 leading therefrom provided with contact 52a, and impact sensing switch 53 which includes contacts 53a and 53b and connected arm 53c extending downwardly therefrom and protruding exteriorly of the under-surface of the drone 16. Lead wire 54 provided with contact 54b is interposed between the switch 53 and a dropping resistor 55 utilized to regulate the amount of current flowing into the primer 25 through the primer wires 23 connected to the resistor. Preferably single shielded wires are used for the lead wires 52 and 54 and primer wires 23, the shield itself being connected to ground; and allowance should be made in the length of the primer wires 23 to account for the stretch of the riser supporting the wires 23 during parachute deployment. A normal dry cell battery may be used as a voltage source 51.

The disconnect assembly is assembled and installed between the nylon risers 15 and main recovery parachute suspension line 28 by means of the bolt 14 provided on the lower support member 11 for attachment of the riser 15 and the upper series of bolts 33 for attachment of the shroud or extension lines 28. The support member 11 and upper coupling member 30 are locked together by inserting the tube portion 32 into the chamber recess 17 and manually forcing the cam member 37 into downward locking position against the balls 36. In this way the flange 18 will engage the outer surface of the balls 36 and prevent disconnection of the tube 32 but at the same time the rolling contact made by the bearing with the flange 18 will permit relative rotation between the coupling and support member without twisting of the shroud lines or riser. The shear pin 42 is passed above the cam member and attached to the cage 32 to insure retention of the cam member in downward locking position. The primer container 20 and enclosed primer 25 are then threaded upwardly into the bore 22 to position the primer within the bore 43 of the cam member 37, and the shielded primer wire 23 is interconnected between the explosive charge 25 and electric sensing system 50 by attaching it to the riser 15.

In operation, and assuming that the target drone 16 or other object is released from an aircraft in flight, upon impact of the switch arm 53c with the ground or water, switch contacts 53a and 53b will be closed by the upward movement of the switch arm to energize the electric circuit 50 from the voltage source 51 to the primer 52. Firing of the explosive charge 25 will force the cam member 37 upward, shearing the wire 42 and permitting the inward movement of the balls 36. The weight of the lower support member 11 and opposite lift of the parachute will then cause rapid disconnection of the disconnect assembly. In this way the target drone 16 will come to an immediate stop thereby preventing any danger of damage from being dragged along the ground by the parachute. As a result of the load weight loss, the parachute will tend to collapse also to permit recovery of both the target drone and parachute with little damage. Furthermore, the simplicity of design and ruggedness of the disconnect assembly will permit its re-use with very little maintenance required.

Of course, other suitable remote control release systems may be utilized with the disconnect assembly described, although the one heretofore set out has been found to be most reliable and effective in operation.

Obviously, many other variations and modifications of the present invention are possible in the light of the above teaching. It is therefore to be understood and it is intended, therefore, in the appended claims to cover all such changes and modifications.

What is claimed is:

1. In a parachute ground release apparatus wherein a disconnect assembly is utilized to interconnect the parachute riser system of a vehicle and a parachute, and an electrically actuated explosive charge to disconnect said assembly in response to the closing of an impact switch just prior to contact of said vehicle with ground surface, said assembly comprising: a riser support member having a socket at the outer end thereof, said socket provided with a lip portion at the entrance thereto and having a bore extending into the opposite end thereof; a parachute terminal member provided with a tubular portion for insertion into said socket, said tube provided with a ball bearing ring circumferentially disposed about the periphery of said tube, the inner race portion of said bearing slidably carried within said tube with an enlarged portion adapted to displace the balls of said bearing outwardly into locking position within said socket, means positioned in said tube to insure retention of said enlarged portion in position against said ball bearing before release, said primer positioned in said bore at one end of said inner race in such a way that firing of said charge is operative to displace said enlarged portion and said means away from said ball bearings to permit release of said bearings and disconnection of said assembly.

2. A parachute ground release apparatus to disconnect the parachute riser system of a load and a parachute just prior to impact of the load with the ground comprising, in combination: a disconnect assembly consisting essentially of a riser coupling member constituting a clevis having a socket portion at the free end thereof, said socket having an annular abutment portion at the entrance thereto and a bore portion at the lower end thereof receiving an explosive charge; a parachute coupling member to connect said riser coupling member to the parachute having a spherical ball retaining cage for insertion into said socket, said cage having a plurality of transverse, circular retaining slots forming annular seats circumferentially spaced about the distal end thereof, a cam member carried within said cage and a plurality of spherical balls suspended between said cam member and each slot, said cam member having an inner, cylindrical race to maintain said balls in an inward released position and an outer, concentric cam surface movable downwardly to force each of said balls to an outward protruding portion exteriorly of each related slot and against said annular abutment to lock said cage within said socket; and release means having impact sensing means extending downwardly from said load, an electrical firing circuit including a primer cord passing into said bore portion, said circuit operative to be closed upon impact of said sensing means with the ground or water and an explosive charge disposed in said bore for energization by said circuit to displace said cam member upwardly for disconnection of said riser coupling member from said parachute coupling member.

References Cited in the file of this patent

UNITED STATES PATENTS

| | | |
|---|---|---|
| 2,420,746 | Heidman et al. | May 20, 1947 |
| 2,435,444 | Johnsen | Feb. 3, 1948 |
| 2,625,423 | Hight | Jan. 13, 1953 |
| 2,650,127 | Carlson | Aug. 25, 1953 |
| 2,726,576 | Musser | Dec. 13, 1955 |

FOREIGN PATENTS

| | | |
|---|---|---|
| 979,155 | France | Dec. 15, 1948 |